(12) United States Patent
Clark

(10) Patent No.: US 6,622,376 B1
(45) Date of Patent: Sep. 23, 2003

(54) CYLINDRICAL FIBER HOLDER

(75) Inventor: Brett G. Clark, Whites Creek, TN (US)

(73) Assignee: Capewell Components Company, LLC, Cromwell, CT (US)

( * ) Notice: Subject to any disclaimer, the term of this patent is extended or adjusted under 35 U.S.C. 154(b) by 0 days.

(21) Appl. No.: 09/549,212

(22) Filed: Apr. 13, 2000

(51) Int. Cl.[7] .............................................. B23Q 15/00
(52) U.S. Cl. ............................. 29/714; 65/501; 385/137
(58) Field of Search ..................... 29/714, 721; 65/501, 65/407; 385/137

(56) References Cited

U.S. PATENT DOCUMENTS

| | | | | |
|---|---|---|---|---|
| 4,447,119 A | * | 5/1984 | Beasley | 385/137 |
| 5,013,345 A | * | 5/1991 | Itoh et al. | 65/407 |
| 5,156,663 A | * | 10/1992 | Itoh et al. | 65/407 |
| 5,216,733 A | * | 6/1993 | Nagase et al. | 385/11 |
| 5,369,473 A | * | 11/1994 | Ogawa et al. | |
| 5,513,295 A | * | 4/1996 | Go | 385/137 |
| 5,766,300 A | | 6/1998 | Hultén et al. | |
| 5,999,684 A | * | 12/1999 | Bloom | 385/137 |
| 6,035,520 A | * | 3/2000 | Yamazaki et al. | |
| 6,038,361 A | * | 3/2000 | Yoshikawa et al. | 385/137 |
| 6,088,503 A | * | 7/2000 | Chandler et al. | 385/137 |
| 6,141,861 A | * | 11/2000 | Armenoff et al. | |
| 6,151,919 A | * | 11/2000 | Hulten et al. | 65/501 |
| 6,400,884 B1 | * | 6/2002 | Matano et al. | 385/137 |

OTHER PUBLICATIONS

Ericsson, brochure *PM Splicing with Ericsson*, date unknown, but prior to Apr. 4, 2000, 4 pages.
Ericsson, User's Manual *Fusion Splicer FSU 925 PM–A*, date unknown, but prior to Apr. 2000, 28 pages.
Ericsson, advertisement, *New Release PM Fusion Splicer*, date unknown, but prior to Apr. 2000, 1 sheet (front and back).

* cited by examiner

*Primary Examiner*—David P. Bryant
(74) *Attorney, Agent, or Firm*—DeLio & Peterson, LLC

(57) ABSTRACT

A cylindrically shaped rotator is provided that can hold either a fiber or a fiber holder along its central axis. A drive roller running parallel to the central axis of the rotator drives the rotator. The diameter of the portion of the drive roller that operates on the rotator is smaller than the diameter of the rotator, so that even large rotational movement of the drive roller produces only small rotational movement of the rotator. The rotator may have a friction band wrapped about its circumference. The drive roller then contacts the friction band directly to rotate the rotator. Alternately, the drive roller may be connected to the rotator by a belt, chain, gear or the like. The rotator may also have markings on its surface, so that the rotational orientation of the rotator and rotational movement of the rotator can be identified. The markings may be binary markings that can be automatically recognized by, for example, a conventional bar code reader.

23 Claims, 6 Drawing Sheets

CYLINDRICAL FIBER HOLDER

BACKGROUND OF THE INVENTION

1. Field of the Invention

The present invention relates to a cylindrically shaped fiber holder that holds a fiber along its primary axis. The holder and associated rotation system allow a conventional motor to precisely rotate a fiber, e.g., an optical fiber, about its longitudinal axis.

2. Discussion of Related Art

Optical fibers are the basis of fiber optical communication systems. While their use is already ubiquitous, it is expected to increase in the future. In order to optimize the use of optical fibers, a number of different type of optical fibers have been developed. One class of optical fibers, referred to as polarization maintaining (PM) optical fibers, is made up of optical fibers that are not rotationally symmetric. PM optical fibers are useful in many applications, such as optical systems, fiber sensors, and coherent optical devices. The cross section of type of PM optical fiber is shown in FIG. 1(A).

The optical fiber 101A shown in FIG. 1(A) is commonly referred to as a "panda" fiber. It has a core 103A, and two oppositely positioned, cylindrically shaped regions of highly doped glass 105A. These regions 105A apply stress on the core 103A. Because of this stress, the fiber 101A achieves two orthogonal principal axes with different refractive indexes, causing different light velocities. Linearly polarized light that is injected into the fiber with its polarization direction parallel to one of the different axes of the fiber will remain parallel to the axis along the length of the fiber. Thus, before two polarization maintaining fibers can be spliced together, the polarization axes of the fibers must be aligned to prevent signal loss across the resulting splice. Accordingly, at least one of the fibers must be rotated about its longitudinal axis to match the alignment of the other fiber.

Other types of polarization maintaining fibers are shown in FIGS. 1(B)–1(D). The PM fiber 101B illustrated in FIG. 1(B), referred to as a "bowtie" fiber, also has a core 103B and two oppositely positioned stress-applying portions 105B. The PM fiber 101C shown in FIG. 1(C) has a core 103C surrounded by an elliptical cladding 105C, while the PM fiber 101D shown in FIG. 1(D) simply has an elliptically shaped core 103D.

In order to splice a polarization maintaining optical fiber 101 to another with the conventional method, the fiber 101 is first positioned in a fiber holder, such as the fiber holder 201 shown in FIGS. 2(A) and 2(B). The fiber holder 201 has a body 203, which defines a recess 205 for holding the fiber 101. It also has a hinged cover 207 for securing the fiber 101 in the recess 205. As seen in FIG. 2(B), the cover 207 has a number of pads 209 for holding the fiber 101 in place within the recess 205.

Turning now to FIG. 3, when the fiber 101 is to be spliced to another fiber, the holder 201 is mounted on a holder mount 301. The holder mount 301 is connected to a rotation shaft 303, which in turn is connected to a gear 305 with teeth 307. The teeth 307 of gear 305 engage the teeth of another gear 311. Gear 311 is connected by a drive shaft 313 to a motor 315. Thus, when the motor 315 turns the gear 311 through the drive shaft 313, the gear 305 rotates the fiber holder 201 on the fiber mount 301 through the drive shaft 303. In this manner, the motor 315 rotates the fiber 101 about its longitudinal axis to align it for splicing.

One problem with this prior art arrangement is the precision of the rotation. Even very short operations of the motor 315 can over-rotate the fiber 101, preventing its proper alignment.

To address this problem, the prior art has employed precision-operated motors, such as stepper motors, to control the rotation of the holder mount 301. While these precision motors offer some improvement over conventional electrical motors, they still do not provide sufficient precision to accurately rotate the fiber 101 for alignment. Moreover, precision motors can be prohibitively expensive for some applications. Accordingly, there is a need for a relatively inexpensive structure that allows an optical fiber 101 to be precisely rotated about its longitudinal axis for alignment with another fiber.

SUMMARY OF THE INVENTION

The invention provides a rotator and associated system that can precisely rotate a fiber about its longitudinal axis for alignment with another fiber. Moreover, the invention allows the fiber to be precisely rotated with a relatively imprecise, conventional electric motor.

According to one aspect of the invention, a cylindrically shaped rotator is provided that can hold either a fiber or a fiber holder along its central axis. The rotator is driven by a drive roller running parallel to the central axis of the rotator. The diameter of the portion of the drive roller that operates on the rotator is much smaller than the diameter of the rotator, so that even large rotational movement of the drive roller produces only small rotational movement of the rotator. Preferably, the diameter of the rotator is 2 to 6 times larger than the effective diameter of the drive roller.

With one aspect of the invention, the rotator has a friction band wrapped about its circumference. The drive roller then contacts the friction band directly to rotate the rotator. With another aspect of the invention, the drive roller is connected to the rotator by a belt, chain, gear or the like.

According to yet another aspect of the invention, the rotator has markings on its surface, so that the rotational orientation of the rotator and rotational movement of the rotator can be identified. With some embodiments of the invention, the markings are binary markings that can be automatically recognized by, for example, a conventional bar code reader.

DESCRIPTION OF PREFERRED EMBODIMENTS

Figure 4A:
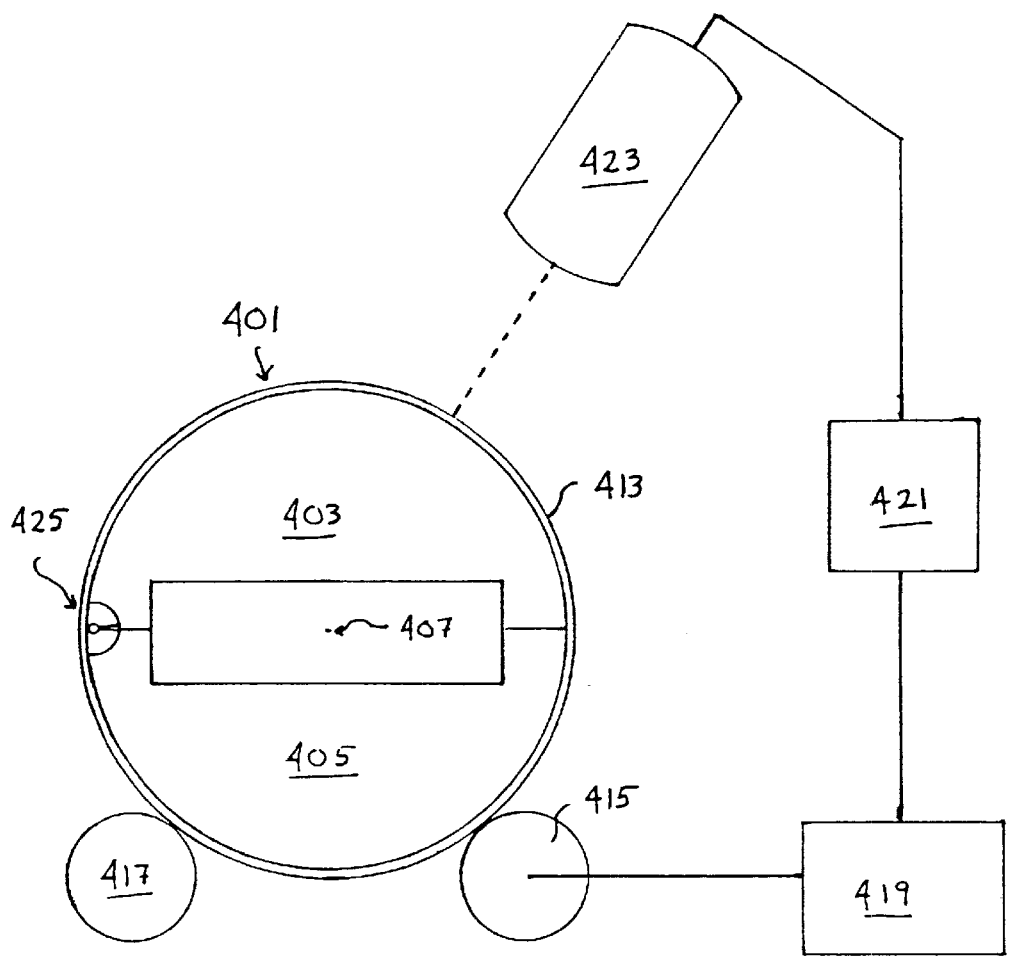
FIG. 4(A) illustrates a cross section of one embodiment of the invention along a direction perpendicular to its central axis.
Figure 4B:
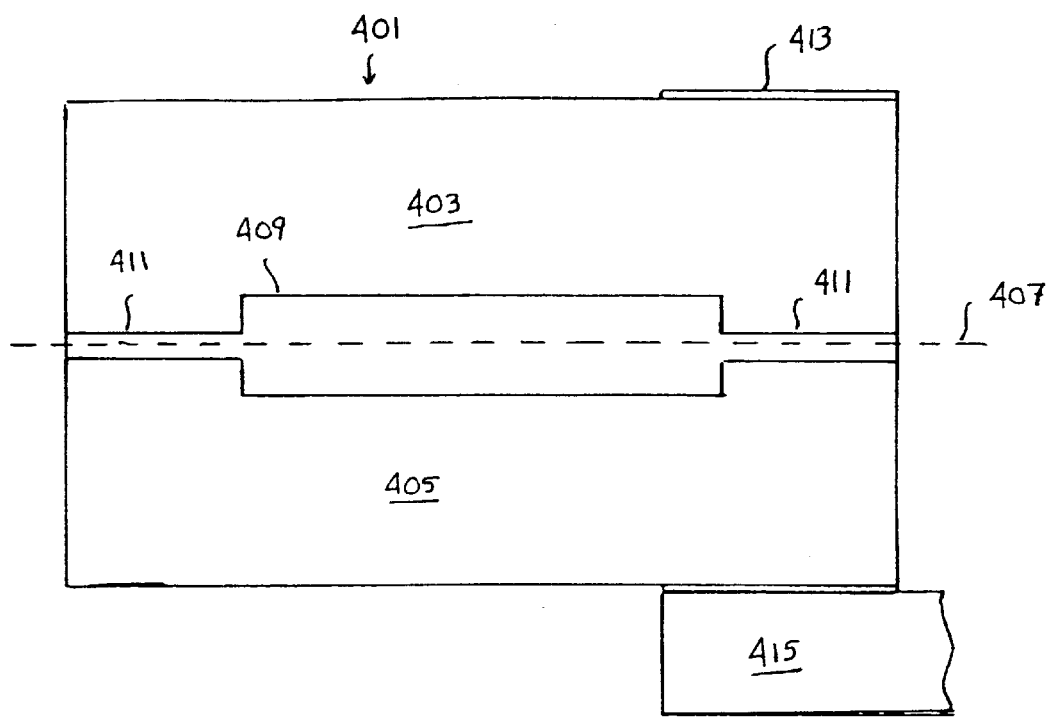
FIG. 4(B) illustrates a cross section of the rotator and drive roller shown in FIG. 4(A) along their central axes.

As shown in FIGS. 4(A) and 4(B), one preferred embodiment of the invention has a cylindrically shaped fiber rotator 401. The rotator 401 is formed from two portions 403 and 405, and has a central axis 407. Together, the portions 403 and 405 define a holder cavity 409. Holder cavity 409 is sized to securely hold a conventional fiber holder 201 such that the longitudinal axis of a fiber 101 held in the fiber holder 201 coincides with the central axis 407 of the rotator 401. The portions 403 and 405 also define two fiber cavities 411 extending from the holder cavity 409. Preferably, both fiber cavities 411 extend along the central axis 407 of the rotator 401. Some embodiments of the invention, however, one of the fiber cavities 411 may extend at an angle to the central axis 407. Still further, other embodiments of the invention may employ only one fiber cavity 411.

Figure 1A:
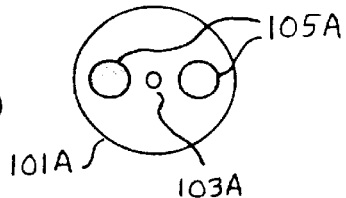
FIGS. 1(A)–1(D) illustrate the cross sections of four different types of polarization maintaining optical fibers.
Figure 1C:
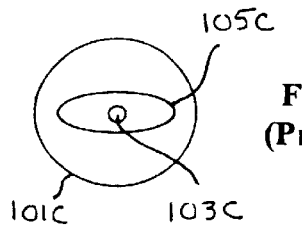
Figure 1B:
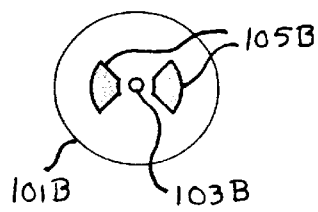
Figure 1D:
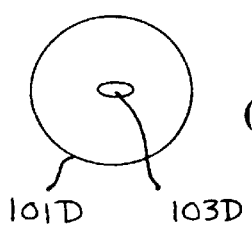
Figure 2A:
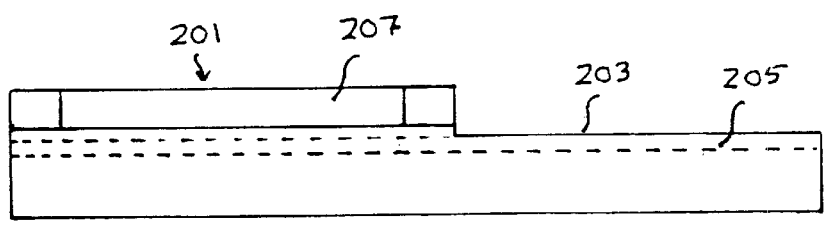
FIG. 2(A) shows the cross section of a conventional fiber holder.
Figure 2B:
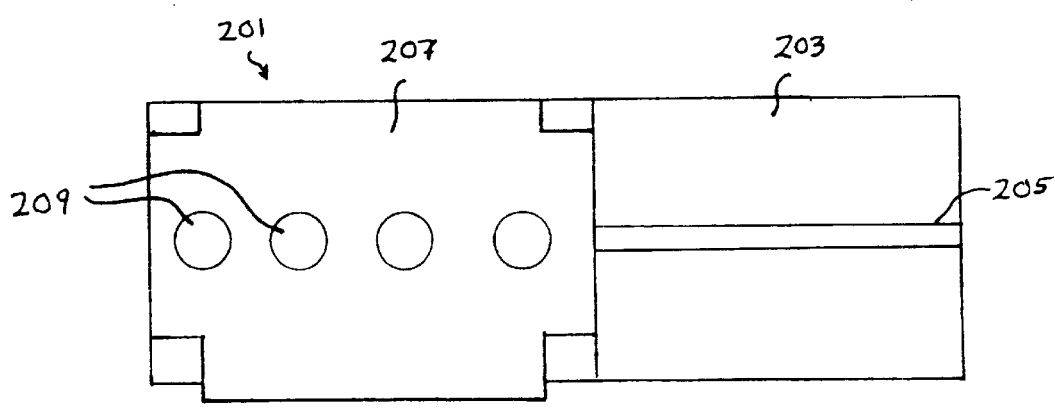
FIG. 2(B) illustrates the top view of the fiber holder of FIG. 2(A).
Figure 3:
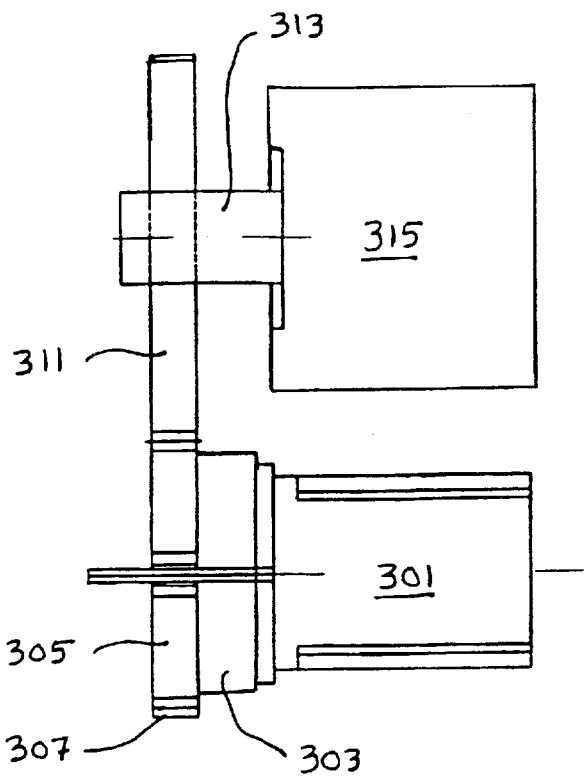
FIG. 3 shows a conventional system for rotating an optical fiber.

As seen in FIG. 2(A), a drive roller 415 and an idler roller 417 support the rotator 401. Preferably, the drive roller 415 and idler roller 417 use magnetic attraction to maintain the position of the rotator 401, but any other suitable method (e.g., vacuum adhesion) may be employed. The drive roller 417 is connected to a motor 419, which is controlled by a controller 421. The embodiment may also include an automatic reader 423 for controlling the operation of the drive roller 415 through the controller 421, as will be explained in detail below.

The circumference of the rotator 401 is encircled with a friction band 413. The friction band 413 provides a friction contact between the rotator 401 and the drive roller 415. As can be seen from FIGS. 4(A) and 4(B), the drive roller 415 runs parallel to the rotator 401. Thus, rotation of the drive roller 415 rotates the rotator 401 about its central axis 409. When a fiber holder 201 holding a fiber 101 is positioned within the holder cavity 409, the drive roller 415 drives the fiber 101 to rotate about the central axis 407 as well.

As shown in FIGS. 4(A) and 4(B), the diameter of the rotator 401 is larger than the diameter of the drive roller 415. For some embodiments of the invention, the diameter of the rotator ranges from 20 mm to 30 mm, while the diameter of the corresponding drive roller 415 ranges from 5 mm to 10 mm. Thus, for these embodiments, the diameter of the rotator is 2 to 6 times larger than the diameter of the drive roller. With this arrangement, even a large rotation of the drive roller 415 will produce only a small rotation of the rotator 401 and the fiber 101. Accordingly, even a relatively imprecise motor will provide very small, precise rotation of the rotator 401. The larger the diameter of the rotator 401 relative to the diameter of the drive roller 415, the more precisely the fiber 101 can be rotated.

Figure 5:
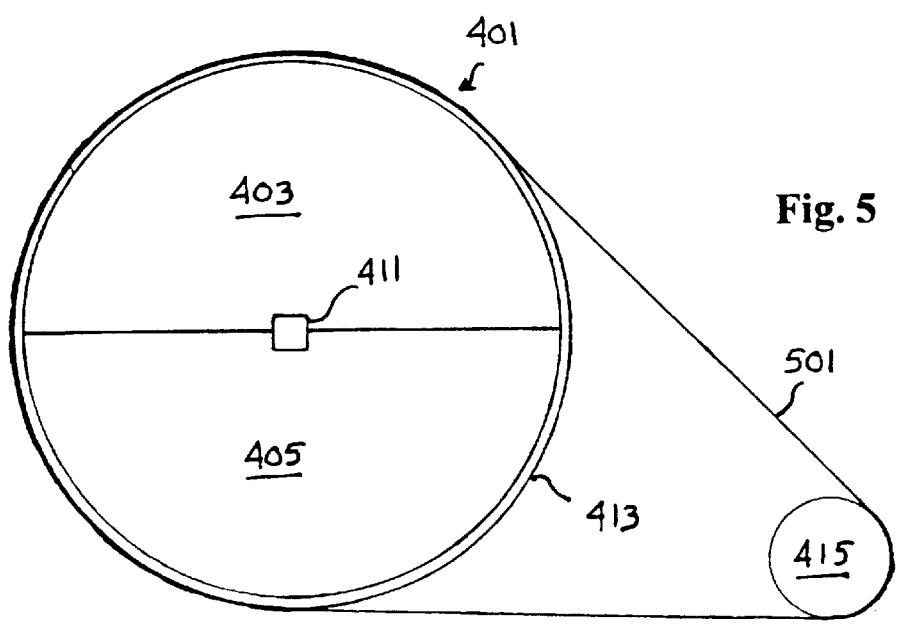
FIG. 5 illustrates an alternate embodiment of the invention.

While only one drive roller 415 and one idler roller 217 are shown in the figures, those of ordinary skill in the art will appreciate that other embodiments of the invention may employ any number of drive rollers 415 or idler rollers 217 to rotate the rotator 401. Further, the drive roller 415 need not directly contact the friction band 413. Instead, as shown in FIG. 5, the rotator 401 may be connected to the drive roller 415 through a drive band 501. Still other embodiments may employ other mechanical connections between the drive roller or rollers 415 and the rotator 401, such as gears, chains, and the like. With these embodiments, the driver actually driving the rotator (e.g., a portion of the drive roller directly driving the rotator, a connection gear, a connection chain, etc.) preferably has a smaller effective diameter than the effective diameter of the rotator 401.

The portions 403 and 405 may be formed from any suitable material, such metal or plastics. Similarly, the friction band 413 may be formed of any suitable material, such as rubber. Also, as shown in FIG. 4(A), portions 403 and 405 are hinged together with a hinge 425. In other embodiments, however, they may interfitting pieces or held together by another mechanism, such as magnetism or clasps.

Figure 6A:
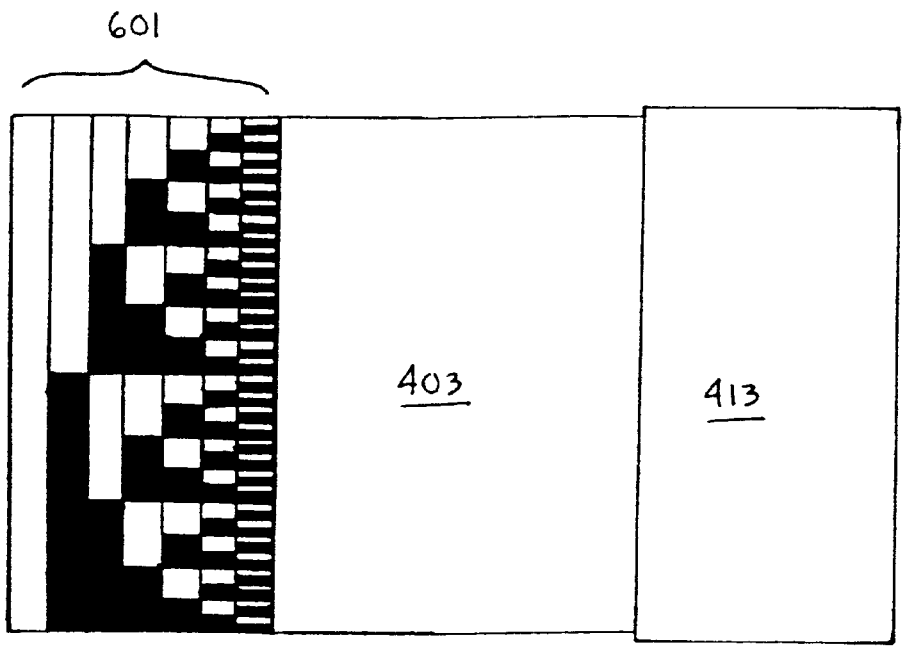
FIG. 6(A) shows a top view of yet another embodiment of the invention.
Figure 6B:
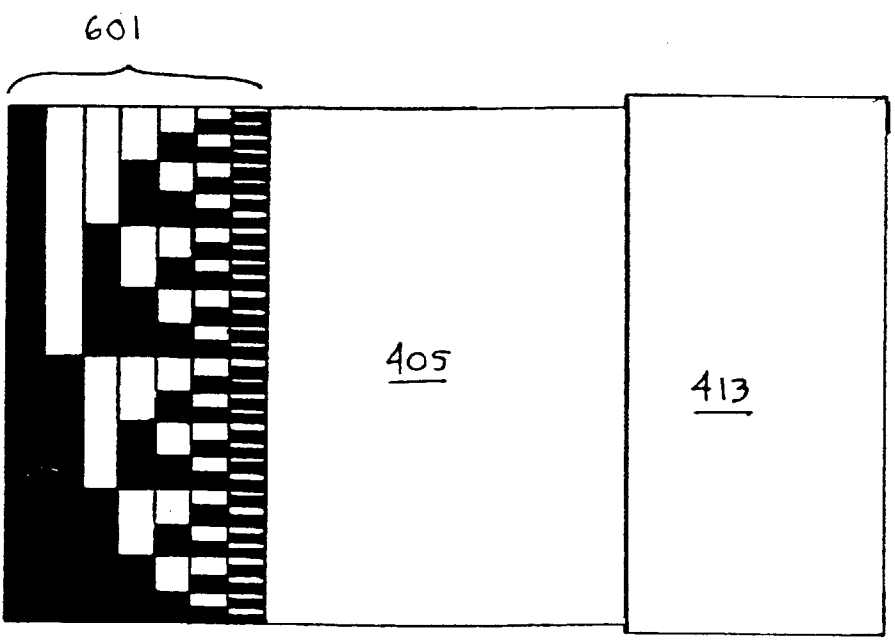
FIG. 6(B) shows a bottom view of the embodiment illustrated in FIG. 6(A).

Another embodiment of the invention is shown in FIGS. 6(A) and 6(B). As can be seen from these figures, the rotator 401 has binary markings 601 about its circumference. The illustrated embodiment has only seven rows of markings, but other embodiments can have fewer or greater numbers of rows of markings. The markings allow the automatic reader 423, which may be a conventional bar code reader, to recognize specific rotational orientations of the rotator 401. For example, seven rows of binary markings alone identify $2^7$ different positions. By recognizing these rotational orientations, the automatic reader 423 can determine the total rotational movement of the rotator 401 (and thus the fiber 101), and control the operation of the drive roller 415 through the motor controller 421 to ensure precise rotation of the fiber 101. Thus, rotational movement of the rotator 401 can be detected by measuring the actual rotation of the rotator 401, instead of the rotation of a driving member.

Discussing the use of the automatic reader 423 in more detail, once the fiber holder 201 holding fiber 101 is positioned in the holder cavity 409, the rotational orientation of the fiber 101 itself can be measured in a conventional manner. For example, the rotational orientation of the fiber can be measured using the known POL (Polarization Observation from Lens) technique or any other desired technique. Similarly, the rotational orientation of the fiber to be spliced to fiber 101 can be measured in a conventional manner. From this information, the user or controller 421 can calculate the angle offset, i.e., the amount fiber 101 needs to be rotated to align it for splicing.

Before the motor 419 is started, automatic reader 423 identifies the initial rotational orientation of the rotator from the binary markings, and the controller 421 then determines what the binary markings should read after the rotation required to align the fiber 101. When the rotator 401 (and thus the fiber 101) has rotated by the calculated amount, the automatic reader 423 recognizes the binary markings corresponding to the final desired rotational orientation. In response, the controller 421 stops the motor 419 driving the operation of drive roller 415. Of course, those of ordinary skill will appreciate that other methods of controlling the rotator (e.g., calculation and recognition of the desired rotator position on the fly) can be employed with the markings.

While binary markings are specifically shown in the figures, those of ordinary skill in the art will appreciate that other types of markings may be used. For example, alphanumeric markings can be employed to identify the rotational orientation and movement of the rotator 401.

Figure 7:
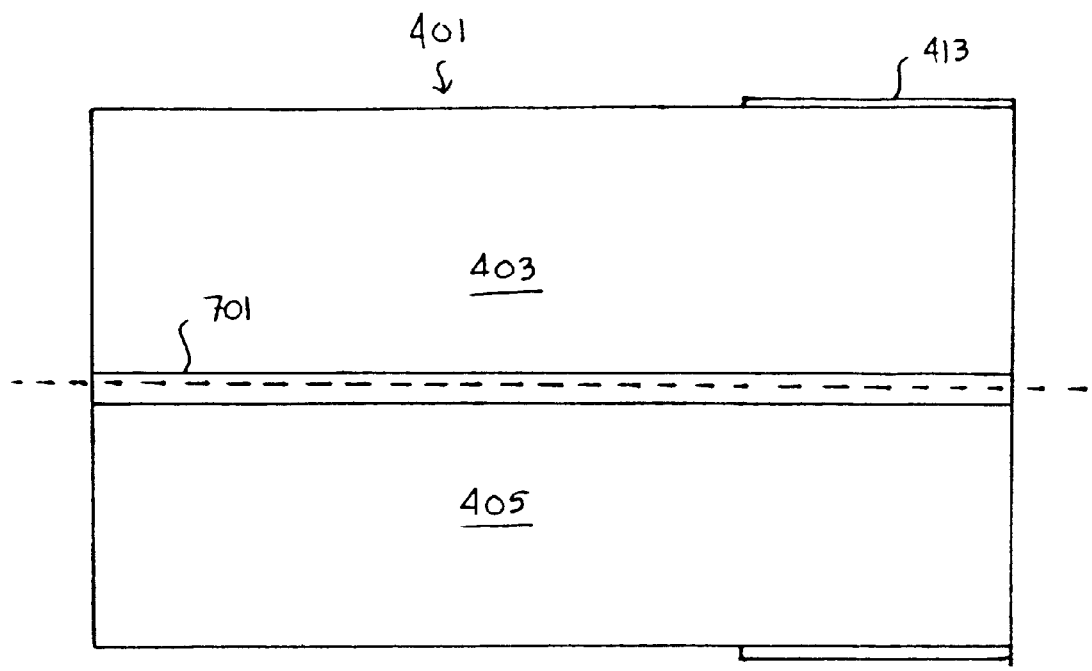
FIG. 7 illustrates a cross sectional view of still another embodiment of the invention along its central axis.
Figure 8:
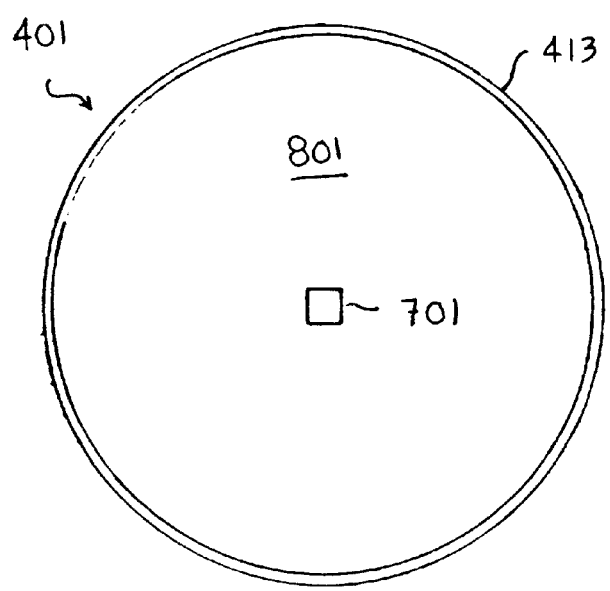
FIG. 8 illustrates a cross sectional view of yet another embodiment of the invention, along a direction perpendicular to its central axis.

Yet another embodiment of the invention is shown in FIG. 7. In this embodiment, the portions 403 and 405 do not form a holder cavity 407. Instead, the portions 403 and 405 form a single, long fiber cavity 701. With this embodiment, the rotator 401 functions as the fiber holder itself. The fiber 101 can be held directly within the fiber cavity 701 by any conventional arrangement, such as a removable adhesive placed within the cavity or by a clamp at the end of the rotator 401. Of course, if a single long fiber cavity 701 is employed, then the rotator 401 need not be formed of multiple components. Instead, the rotator 401 can be formed of a single piece of material 801 as shown in FIG. 8.

Thus, the various embodiments of the invention provide a rotator and rotator system that can precisely rotate a fiber without requiring a precision motor. Moreover, embodiments of the invention provide markings for quickly and accurately identifying the rotational orientation and rotational movement of the rotator.

Although the present invention has been described with reference to specific embodiments and examples of the invention, it will be apparent to those of ordinary skill in the art that the invention is not limited to these specific embodiments and examples, but extends to other embodiments within the spirit of the invention.

I claim:

1. An apparatus for rotating a fiber, comprising:
   a cylindrical rotator, the cylindrical rotator defining
      a central axis running along a length of the cylindrical rotator; and
      a fiber cavity for holding a fiber to be rotated, at least a portion of the fiber cavity being parallel to the central axis; and
   a driver for rotating the cylindrical rotator about the central axis, the driver having an effective diameter smaller than a diameter of the rotator;
   wherein the rotator has markings for identifying a rotational orientation of the rotator.

2. The apparatus of claim 1, wherein the rotator is formed from two semi-cylindrical portions.

3. The apparatus of claim 1, wherein the markings are binary markings.

4. The apparatus of claim 1, wherein the rotator further defines a fiber holder holding cavity for holding a fiber holder.

5. The apparatus of claim 2, wherein the two semi-cylindrical portions are joined together with a hinge.

6. The apparatus of claim 1, further including a reader for reading the markings, and
   controlling operation of the driver based upon markings read by the reader.

7. The apparatus of claim 6, wherein the reader is a bar code reader.

8. The apparatus of claim 1, further including a friction belt wrapped around a circumference of the rotator for mechanically connecting the rotator to the driver.

9. The apparatus of claim 8, wherein the driver is mechanically connected to the friction belt by a drive band.

10. An apparatus for rotating a fiber, comprising:
    a cylindrical rotator, the cylindrical rotator defining
       a central axis running along a length of the cylindrical rotator;
       a fiber cavity for holding a fiber to be rotated, at least a portion of the fiber cavity being parallel to the central axis, and
       an external surface;
    indicia on the external surface, such that the indicia permits identification of a rotational orientation of the rotator about its central axis; and
    a driver for rotating the cylindrical rotator about the central axis.

11. The apparatus of claim 10, wherein the rotator further defines a fiber holder holding cavity for holding a fiber holder.

12. The apparatus of claim 10, wherein the indicia are binary.

13. The apparatus of claim 10, wherein the rotator is formed from two semi-cylindrical portions.

14. The apparatus of claim 13, wherein the two semi-cylindrical portions are joined together with a hinge.

15. The apparatus of claim 10, further including a reader for reading the indicia, and controlling operation of the driver based upon indicia read by the reader.

16. The apparatus of claim 15, wherein the reader is a bar code reader.

17. The apparatus of claim 10, further including a friction belt wrapped around a circumference of the rotator for mechanically connecting the rotator to the driver.

18. The apparatus of claim 17, wherein the driver is mechanically connected to the friction belt by a drive band.

19. A rotator device for rotating a fiber, comprising:
    a cylindrical rotator, the cylindrical rotator defining
       a central axis running along a length of the cylindrical rotator;
       a fiber cavity for holding a fiber to be rotated, at least a portion of the fiber cavity being parallel to the central axis, and
       an external surface; and
    indicia on the external surface, such that the indicia permits identification of a rotational orientation of the rotator about its central axis.

20. The apparatus of claim 19, wherein the rotator further defines a fiber holder holding cavity for holding a fiber holder.

21. The apparatus of claim 19, wherein the indicia are binary.

22. The apparatus of claim 14, wherein the rotator is formed from two semi-cylindrical portions.

23. The apparatus of claim 22, wherein the two semi-cylindrical portions are joined together with a hinge.

* * * * *